United States Patent [19]

Wells, III et al.

[11] 4,022,615
[45] May 10, 1977

[54] AGGLOMERATES OF SILICON AND SILICON BASE ALLOY PARTICLES

[75] Inventors: James E. Wells, III, Kenmore; Anthony F. Nasiadka, Lockport, both of N.Y.

[73] Assignee: Union Carbide Corporation, New York, N.Y.

[22] Filed: Apr. 17, 1975

[21] Appl. No.: 568,984

[52] U.S. Cl. .................................. 75/130 R; 75/3; 264/10

[51] Int. Cl.² ......................................... C22B 1/08

[58] Field of Search ............. 75/130 R, 3; 264/110

[56] References Cited

UNITED STATES PATENTS

| 3,309,196 | 3/1967 | Kaneko | 75/3 |
| 3,816,095 | 6/1974 | Bruen | 75/3 |
| 3,852,059 | 12/1974 | Bruen | 75/3 |

*Primary Examiner*—P. D. Rosenberg
*Attorney, Agent, or Firm*—Frederick J. McCarthy, Jr.

[57] ABSTRACT

An agglomerate of silicon and silicon base alloy particles having an in situ formed matrix of alkali metal silicate.

4 Claims, No Drawings

AGGLOMERATES OF SILICON AND SILICON BASE ALLOY PARTICLES

The present invention is directed to agglomerates of silicon and silicon base alloy particles. More particularly, the present invention is directed to agglomerates of silicon and silicon base alloys having a binder in the form of a silicate matrix.

In the manufacture of silicon and silicon base alloys, which are used industrially as additions to iron and steel, a certain amount of fine particles are generated in the course of crushing and grinding operations. Over a period of time the fine particles accumulate to sizeable amounts and the fines are commonly formed into agglomerates using Portland cement as a binder. The agglomerates are then re-cycled into furnaces producing silicon or silicon base alloys, or sold as additives. This practice has disadvantages in that the CaO content of the cement binder could adversely affect furnace operation and the cement binder requires a significant amount of time to be cured to achieve satisfactory handling strength.

It is therefore an object of the present invention to provide self-drying agglomerates of silicon or silicon base alloy particles having good handling strength which can be produced rapidly and without the use of interfering binders.

Other objects will be apparent from the following description and claims.

A method in accordance with the present invention comprises compacting a wet mix of alkali metal hydroxide solution and finely divided particles of silicon or silicon base alloy into a desired shape whereby the alkali metal hydroxide reacts with the particles to form a silicate which results in a strong particle binding matrix of alkali metal silicate. The reaction between the particles and alkali metal hydroxide is exothermic and the heat developed serves to dry the agglomerate.

One embodiment of the present invention is practiced by mixing particles of silicon and/or a silicon base alloys with a solution of alkali metal hydroxide. The particles are suitably sized ¼ inch and finer and the concentration of the alkali metal hydroxide solution is suitably 1M to 12M. The mixture, suitably in the form of a wet mix, containing about 1¾ to 2% by weight alkali metal hydroxide, is poured into a suitable container. The wet mix need not be pressed but can be pressed at pressures up to 20 tons psi. The transfer of the mix to the mold should be made promptly after preparation of the mix since reaction between the silicon constituent of the particles and alkali metal hydroxide proceeds fairly rapidly. In the course of reaction between the particles and alkali metal hydroxide in the mold, alkali metal silicate is formed as a matrix which binds the particles. The silicate forming reaction is exothermic and the heat generated dries the compact in a relatively short time. Upon drying the compact is strong and can be routinely handled and transported.

In a further embodiment of the present invention, a wet mix as formed above is compacted using flat rolls to obtain a product in flake form.

In a further embodiment of the present invention dry, solid alkali metal hydroxide can be blended with silicon or silicon base alloy particles with added water and formed into shapes, the water serving to dissolve the alkali metal hydroxide and form a binding silicate phase upon reaction of the dissolved alkali metal hydroxide with the metal particles.

In the present invention, up to 85% by weight of fine particles other than silicon base alloys can be mixed with silicon or silicon base alloys. Such materials can for example be zirconia sand and manganese fines.

The following examples will further illustrate the present invention:

EXAMPLE I

A blended dry mixture was prepared from the following materials:
25 parts by weight silicon base alloy (63% Si)—sized 35 mesh
45 parts by weight $Zr_2O_3$ sand—sized 35 mesh
30 parts by weight FeMn alloy (½% Si 80% Mn 12% Fe bal. C.)—sized ¼ inch.

One and one-half parts by weight of NaOH were added to 8 parts by weight water and the solution was added to and mixed with the dry blended mixture to form a wet mix which was promptly tamped into a wooden form 1 foot × 1 foot × 4 inches. After about 30 minutes the mixture was a solid, strong body in which the constituent particles were bonded by a matrix of sodium silicate.

EXAMPLE II

100 Parts of silicon base alloy particles (63% Si, 6% Mn, 6% Zr bal. Ca, Al, Fe) sized 35 mesh and finer were mixed with a NaOH solution (½ part by weight NaOH in 1½ parts by weight of water) and the wet mix was compacted in flat rolls (roll pressure of 20 tons per linear inch). The resulting product was in flake form sized about ¼ inch by 35 mesh in which the constituent particles were bonded by a matrix of sodium silicate. The above-described re-constituted material was used as an innoculant addition to gray iron and performed as effectively as an addition of massive, commercially sized material of the same composition.

Silicon base alloys as used herein refer to alloys containing at least about 45% by weight silicon and include materials such as iron, manganese, zirconium, strontium, magnesium, barium and aluminum.

In the present invention both NaOH and KOH can be used as the alkali metal hydroxide. NaOH is the preferred alkali metal hydroxide for reasons of economy. The mesh sizes referred to herein are U.S. Screen series.

What is claimed is:

1. Method for making agglomerates of finely divided silicon bearing particles which comprises
   contacting finely divided particles of at least one material selected from the group consisting of silicon and silicon base alloys with an aqueous solution of alkali metal hydroxide to provide a wet mix and compacting the wet mix under ambient temperature conditions to provide an exothermic reaction between said finely divided particles and said alkali metal hydroxide and the formation under ambient temperature conditions of a dried agglomerate formed of said divided particles in a matrix of alkali metal silicate.

2. A method in accordance with claim 1 wherein the concentration of the alkali metal hydroxide solution is from about 1M to 12M.

3. A method in accordance with claim 1 wherein the alkali metal hydroxide is about ¼ to 2% by weight of said mixture.

4. As an article of manufacture an agglomerate consisting essentially of finely divided particles of at least one material selected from the group consisting of silicon and silicon base alloys, said particles being binded as an agglomerate by an in situ formed matrix of alkali metal silicate formed by an exothermic reaction of said particles with an aqueous solution of alkali metal hydroxide under ambient temperature conditions, said exothermic reaction providing the heat required to dry said agglomerate.

* * * * *

UNITED STATES PATENT OFFICE
CERTIFICATE OF CORRECTION

Patent No. 4,022,615          Dated  May 10, 1977

Inventor(s) James E. Wells, et al.

It is certified that error appears in the above-identified patent and that said Letters Patent are hereby corrected as shown below:

Column 1, Line 47 - "174" should read ---1/4----.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*